United States Patent [19]

Hashimoto

[11] Patent Number: 5,743,115
[45] Date of Patent: Apr. 28, 1998

[54] WASHING MACHINE HAVING A RINSE MODE

[75] Inventor: Yoshimi Hashimoto, Aichi-ken, Japan

[73] Assignee: Kabushiki Kaisha Toshiba, Kawasaki, Japan

[21] Appl. No.: 743,036

[22] Filed: Nov. 4, 1996

Related U.S. Application Data

[62] Division of Ser. No. 423,757, Apr. 18, 1995, Pat. No. 5,606,877.

[30] Foreign Application Priority Data

Apr. 18, 1994 [JP] Japan ................ 6-078469

[51] Int. Cl.$^6$ ..................... D06F 33/02
[52] U.S. Cl. .......... 68/12.12; 68/12.01; 68/12.04; 68/12.05; 68/12.06; 68/23.5
[58] Field of Search ............. 68/12.01, 12.02, 68/12.04, 12.05, 12.06, 12.12, 23.5

[56] References Cited

U.S. PATENT DOCUMENTS

| | | |
|---|---|---|
| 5,167,722 | 12/1992 | Pastryk et al. |
| 5,230,228 | 7/1993 | Nakano et al. |
| 5,297,307 | 3/1994 | Baek . |
| 5,469,719 | 11/1995 | Imai et al. ............ 68/12.12 X |

FOREIGN PATENT DOCUMENTS

| | | |
|---|---|---|
| 2854148 | 6/1979 | Germany . |
| 3900826 | 7/1990 | Germany . |
| 77495 | 4/1988 | Japan . |
| 127794 | 5/1988 | Japan . |
| 4256792 | 9/1992 | Japan . |
| 2253074 | 8/1992 | United Kingdom ........ 68/12.01 |

*Primary Examiner*—Philip R. Coe
*Attorney, Agent, or Firm*—Cushman Darby & Cushman IP Group of Pillsbury Madison & Sutro LLP

[57] ABSTRACT

A washing machine having a rinse mode for rinsing laundry placed in a tub of the washing machine. Rinse mode control means controls water supply to the tub and rotation of the tub to carry out a spin dry rinse mode. The spin dry rinse mode includes a first operation during which water is supplied into the tub while the tub is rotated and a second operation during which the supply oft water is stopped and the tub is rotated. The washing machine further includes means for detecting the amount of laundry put into the tub. A rinse time change means controls the time for spin dry rinse mode in accordance with the amount of laundry detected. Thus, time can be saved and water conserved while still effectively rinsing the laundry.

16 Claims, 9 Drawing Sheets

WASHING MACHINE HAVING A RINSE MODE

This is a division of application Ser. No. 08/423,757, filed Apr. 18, 1995, and now Patent No. 5,606,877 allowed Aug. 29, 1996.

BACKGROUND OF THE INVENTION

1. Field of the Invention

The present invention related to a washing machine having a rinse mode for removing detergent from laundry therein.

2. Description of Related Art

Clothes washing machines generally include as part of their operation, a rinse mode to remove detergent from the laundry after a detergent washing. In a conventional washing machine operating in its rinse mode, so called hold water rinse mode, detergent wash water is discharged from the washing tub, after which the tub is filled by clean water. When the incoming new water reaches a predetermined level in the tub, the water supply is stopped and an agitator provided at the center of the tub is rotated. Detergent permeated into the laundry is dissolved into the new water in the tub by the action of the water being moved by the agitator. After a predetermined time, the water dissolving detergent is discharged from the tub. This process may be repeated one or more times. This hold water rinse mode operation wastes a considerable amount of water when the discharge and full filling is repeated.

Therefore, another type of rinse mode, a so called a spin dry rinse mode, which reduces the consumption of water, was developed. Spin dry rinse mode operation includes one or more spin dry rinse cycles. In each spin dry rinse cycle there is a spin dry rinse operation and a spin dry operation. In the spin dry rinse operation, water in the tub is drained from the tub after the detergent washing, then, new water is supplied into the tub while the tub is being rotated. The supplied water permeates into the laundry because of the tub rotation. After the spin dry rinse operation is completed, the spin dry operation is started. During spin dry operation, water supply is stopped, but rotation of tub continues. The permeating water is separated from the laundry and exhausted by the centrifugal force of the tub rotation. The spin dry rinse cycle including the stopping and starting water supply and tub rotation is repeated a predetermined number of times in spin dry rinse mode operation. This spin dry rinse mode can reduce the consumption of water. Further, the spin dry rinse mode is more efficient at removing detergent from laundry than the hold water rinse mode.

However, in the conventional washing machine, the spin dry rinse mode is carried out at a predetermined time period, and has a predetermined number of spin dry rinse cycles. Both the time period at which spin dry rinse mode operation takes place and the number of spin dry rinse cycles that will be carried out are preset and cannot be changed by user. The time period and the number of cycles are decided based on a heavy laundry load. In other words, the spin dry rinse mode is designed to handle loads in which much laundry is placed in the tub and much detergent is put into the tub such that the result of rinse mode is not insufficient. Therefore, when only a light load of laundry is being washed, the volume of water used in the spin dry rinse mode is often excessive, and the time period of the spin dry rinse mode is also significantly long for the laundry to be rinsed. Thus, the spin dry rinse mode operation, as now carried out is inefficient for light laundry loads. Furthermore, during spin dry rinse operation of the spin dry rinse mode, when the tub is rotating while water is being supplied to the tub, an unbalance of rotation often occurs.

SUMMARY OF THE INVENTION

It is an object of the invention to provide an improved washing machine having a rinse mode to rinse laundry being washed.

It is another object of the invention to reduce water consumption during rinse mode operation.

It is another object of the invention to allow the user to select the number of spin dry rinse cycles that will occur during spin dry rinse mode operation and the time period for spin dry rinse mode operation.

It is further object of the invention to prevent unbalanced rotation during spin dry rinse mode operation.

To achieve the above objects, there is provided an improved washing machine having a rinse mode for rinsing laundry being washed in a tub of the washing machine. The washing machine has rinse mode control means for controlling 1) water supply into the tub and 2) rotation of the tub to carry out a spin dry rinse mode. The spin dry rinse mode includes a first operation during which water is supplied into the tub while the tub is rotated and a second operation during which water supply is stopped while the tub continues to be rotated. The washing machine has an arrangement for detecting the amount of laundry that is being washed in the tub, and operation change means for changing the time period of the spin dry rinse operation in accordance with the amount of laundry detected by laundry amount detect means.

The spin dry rinse mode can include a plurality of a spin dry rinse cycles each of which comprises first and second operations. The washing machine includes operation change means which can control the number of spin dry rinse cycles that occur during spin dry rinse mode operation in accordance with the amount of laundry being washed as detected by laundry amount detect means.

Another improvement embodied in the present invention is the inclusion of an unbalance detect means for detecting an unbalance rotation of the tub. When the unbalance detecting means detects the unbalance rotation, unbalance recovery means supplies water into the tub and agitates the water and the laundry by operating an agitator. Operation change means changes the time period of the spin dry rinse mode operation in accordance with the detection of the unbalance rotation or the number of spin dry rinse cycles in accordance with the detection of the unbalance rotation.

Another improvement provided by the present invention relates to the inclusion in the washing machine of a rinse degree select means for selecting a degree of rinse. The operation change means controls the time period during which the washing machine operates in spin dry rinse mode or the number of spin dry rinse cycles in accordance with a selected degree of rinse.

Another improvement relates to the inclusion of two rinse modes, one being a spin dry rinse mode, and the other being a hold water rinse mode. During hold water rinse mode operation, controlled by hold water rinse control means, water is supplied to the tub and an agitator in the tab is rotated. The washing machine has a laundry amount detect means for detecting an amount of the laundry placed in the tub. Operation change means controls the rinse operation such that when the degree selected by the rinse degree select means is higher than a predetermined degree, either the spin dry rinse mode or hold water rinse mode is selected according to the amount of laundry detected by laundry amount detect means.

During the first operation of the spin dry rinse mode, the rotating speed of the tub is controlled to avoid a resonance speed or at more than secondary resonance speed and less than quaternary resonance speed by tub rotating speed control means.

DETAILED DESCRIPTION OF PREFERRED EMBODIMENT

A presently preferred exemplary embodiment of the present invention will be explained with reference to the accompanying drawings.

Figure 1:
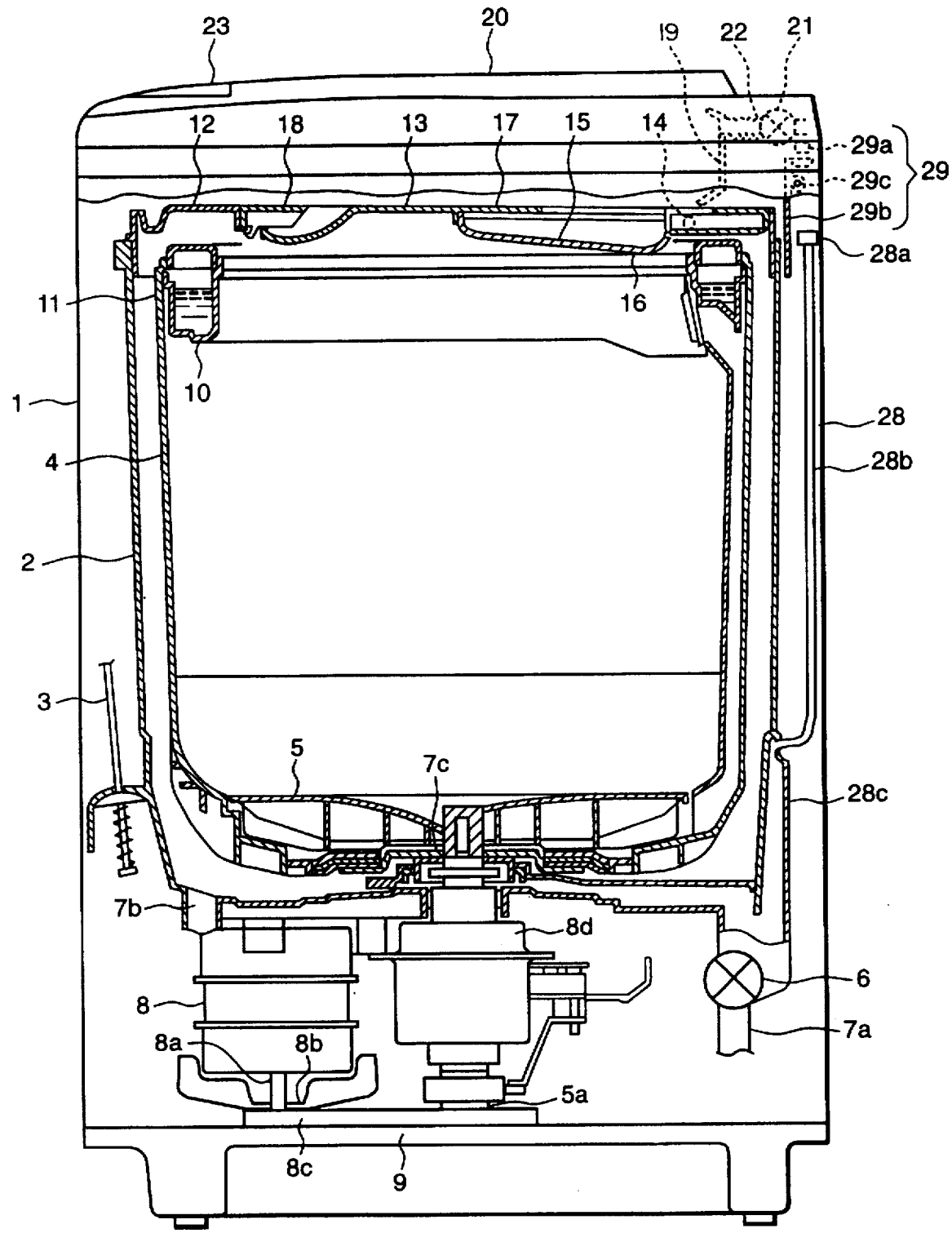
FIG. 1 is a cross-sectional view of a washing machine according to the present invention.

FIG. 1 is a cross-sectional view of a washing machine according to the present invention. An outer tub 2 is placed in an outer case 1 of the washing machine, and supported by an elastic suspension mechanism 3 which is only partly shown in FIG. 1. A rotating tub 4, into which laundry to be washed is placed, is rotatably mounted within outer tub 2. An agitator 5 is rotatably mounted at the bottom center of rotating tub 4. A water discharge valve 6 for controlling water flow from the tub 4 and a water discharge hose 7a for discharging water from tub 4 are arranged below outer tub 2. When discharge valve 6 is opened, water in tub 4 passes through discharge hose 7a via a discharge hole 7c at a bottom portion of rotating tub 4 and discharge valve 6. When discharge valve 6 is closed, water is not evacuated from rotating tub 4 and it can remain filled. A through hose 7b, also arranged below outer tub 2, has one end connected to discharge hose 7a and its other end connected to the bottom of outer tub 2 (not shown in FIG. 1). Through hose 7b has no valve. Therefore water dropped into outer tub 2 is quickly discharged out of washing machine through hoses 7a and 7b. Agitator 5 for washing laundry placed in rotating tub 4 is rotated by a driving mechanism 9 which is arranged below outer tub 2. A motor 8, providing power for driving mechanism 9, has a motor axis 8a and a pulley 8b firmly connected to motor axis 8a. Pulley 8b drives a rotating axis 5a of a transmission 8d by a belt 8c wrapped around pulley 8b. Transmission 8d selectably rotates either only agitator 5 or both agitator 5 and rotating tub 4 in accordance with the mode of operation of the washing machine. During washing and hold water rinse mode operations, transmission 8d rotates only agitator 5. However, during a spin dry mode operation for drying the laundry and during a spin dry rinse mode operation for rinsing the laundry, the transmission 8d rotates agitator 5 and rotating tub 4.

Rotating tub 4 has several water extraction holes 11 only at an upper part of the tub where a balance ring 10 is fitted. During a spin dry operation (part of spin dry rinse mode), water spun out of the laundry passes through extraction holes 11 through a gap between rotating tub 4 and balance ring 10. A flat ring-shaped tub cover 12 is fitted on the top of outer tub 2. An inner lid 13 is supported on tub cover 12 by a spindle 14 at a rear end thereof so as to be vertically rotatable so that it can open and close an opening at the center of tub cover 12. When tub cover 12 is closed it covers the upper portion of rotating tub 4. A concave shaped part 15 is formed in the rear center of tub cover 12 and near a peripheral portion of inner lid 13. The bottom of part 15 is shaped so that its front portion is lower than its rear portion. A large number of drain holes 16 are formed in the rear portion of part 15. A handle 18 for opening inner lid 13 is provided at the front of the inner lid. A top cover 20, which is vertically rotatable, can open and cover inner lid 13 and tub cover 12. A water supply system 22, including a water guide 19 and a water supply valve 21 is placed at a rear portion of the washing machine, between top cover 20 and tub cover 12. Water supplied through water supply valve 21 flows to part 15 along water guide 19. Water drops into rotating tub 4 passing through drain holes 16 of part 15. Thus, drain holes 16 function as a sprinkler for the laundry placed in the rotating tub 4. A concave cover 17, provided at inner lid 13, covers the open upper portion of part 15 except for the upper portion of drain holes 16 to prevent water dropped from water guide 19 from scattering around part 15.

A water level sensor 28 includes an electrical presser sensor 28a and an air tube 28b connected to an air trap 28c which is between the bottom of rotating tub 4 and discharge valve 6. Water in rotating tub 4 presses the air in air tube 28b via water trap 28c, thus, the air pushes the pressure sensor 28a with a pressure related to the amount of the water in rotating tub 4. As a result, pressure sensor 28a can detect the water level in rotating tub 4. A unbalance detect switch 29 is provided under water supply valve 21. Unbalance detect switch 29 includes a micro switch 29a for detecting a swing of outer tub 2 via a L-shaped lever 29b which is rotatably supported by a pivot 29c. When rotating tub 4 is unbalance because of a partial of laundry and so on, outer tub 2 swings and hits L-shaped lever 29b and L-shaped lever 29b rotates around pivot 29c and its one end temporally pushes micro switch 29a. Accordingly, micro switch 29a enables detection of an unbalance of rotating tub 4. Of course other types of unbalance detector arrangements can be used. Examples would include 1) electrical unbalance detection which uses a detection of change of motor current when motor 8 activates, can be applied; 2) mechanical unbalance detection devices; and 3) other electrical unbalance detection devices. There is an operating panel 23 provided at the front of top cover 20.

Figure 2:
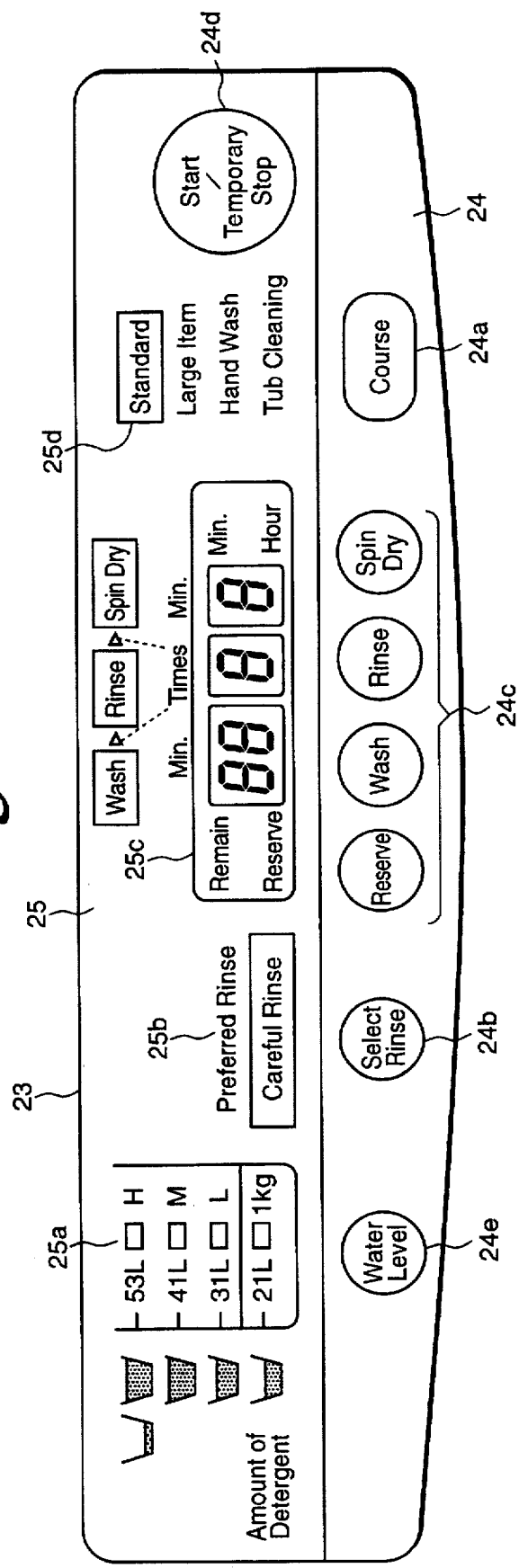
FIG. 2 is a front view of an operation panel of the washing machine.

Referring now to FIG. 2, operating panel 23 will be further described. Operating panel 23 has a switch input unit 24 which includes a course selection switch 24a, a rinse select switch 24b, wash reserve time and mode setting switches 24c, a starting switch 24d and a water level selecting switch 24e. Rinse select switch 24b for selecting the degree of rinse desired, alternatively selects a "Preferred Rinse" which is normal rinse, or "Careful Rinse" which is stronger than the normal rinse. Operating panel 23 includes a display unit 25 which includes laundry weight and water level display 25a, a rinse mode display 25b, time display 25c and washing course display 25d. Laundry weight and water level display 25a displays the laundry weight, corresponding water level and preferred detergent amount by LEDs. Rinse mode display 25b and washing course display 25d display the selected mode and course respectively. At these displays, the selected mode and course are displayed by turning on a liquid crystal frame. Time display 25c has four 7-segment digit light emitting diodes (LED). It displays a reservation time or a number of times for rinse mode operation or a time period for each operation.

Figure 3:
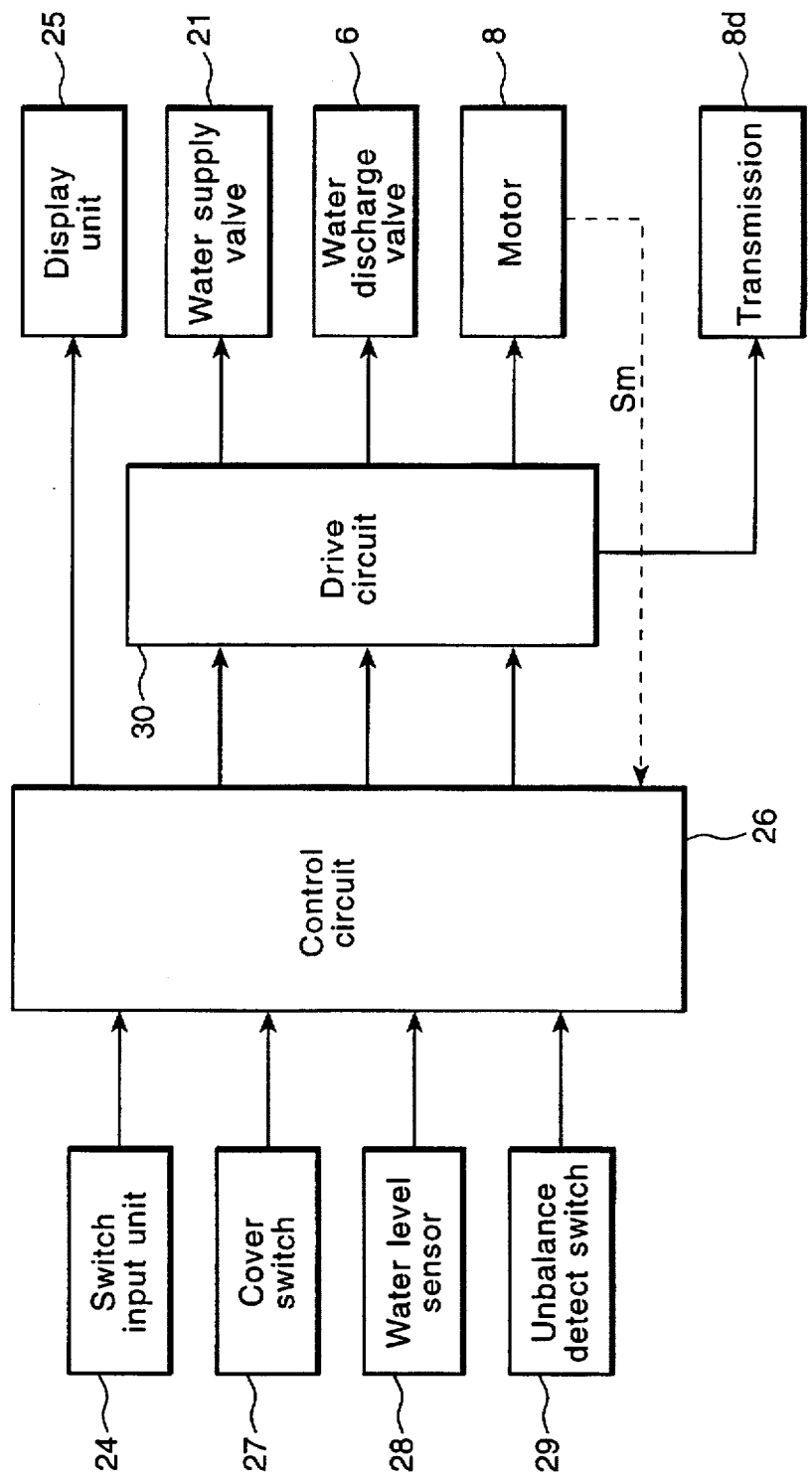
FIG. 3 is a block diagram of control components of the washing machine.

A block diagram of the washing machine is shown in FIG. 3. Control circuit 26 is constituted by a micro-computer along with various peripheral devices, such as A/D converters, and the like. The A/D converters can be of various types including but not limited to pre-installed circuits in the microprocessor, software in a microcomputer, and external circuits. A cover switch 27 is preferably constituted by a micro switch attached near a rotating axis of top cover 20. Switch 27 detects the opening and closing of top cover 20. Control circuit 26 inputs switching signals from a switch input unit 24 and cover open/close signals from switch 27. Water level sensor 28 detects the water level in rotating tub 4 and outputs a water level signal. The water level signal and an unbalance detection signal from an unbalance detect switch 29 are also input to control circuit 26. Control circuit 26 controls water supply valve 21, motor 8, transmission 8d and water discharge valve 6 via drive circuit 30. Drive circuit 30 includes relays and amplifiers, based on the inputs described above together with pre-stored control programs stored in a memory of the micro-computer. Control circuit 26 further controls display unit 25. In this manner, control circuit 26 controls all aspects of washing including the various modes of operation, i.e. washing mode and spin dry rinsing mode. Thus, control circuit 26 functions as a spin dry rinse mode control device, a laundry weight detect device, a spin dry rinse degree select device and a spin dry rotation control device.

Figure 5:
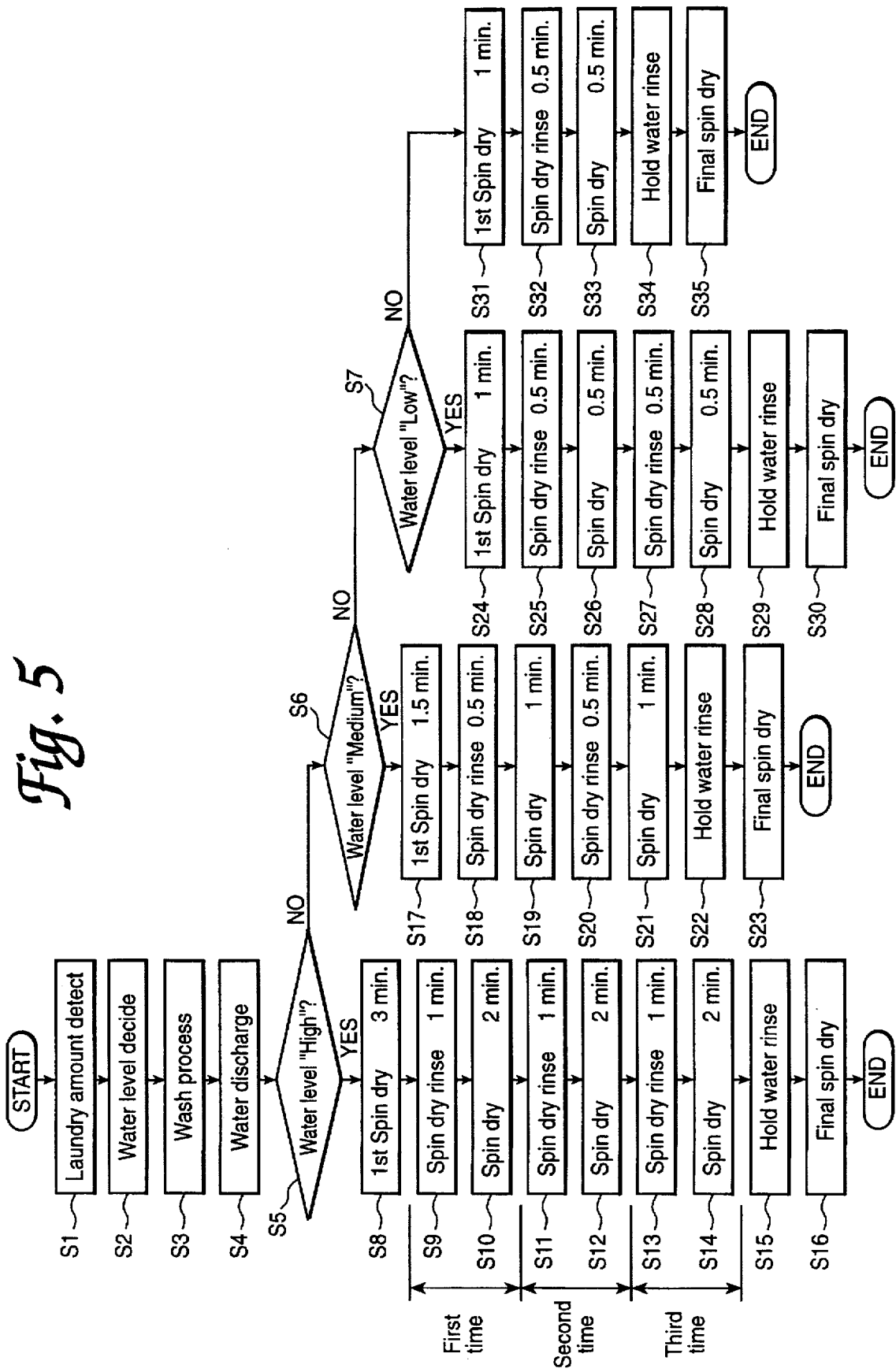
FIG. 5 is a flowchart explaining control of the washing machine.
Figure 6:
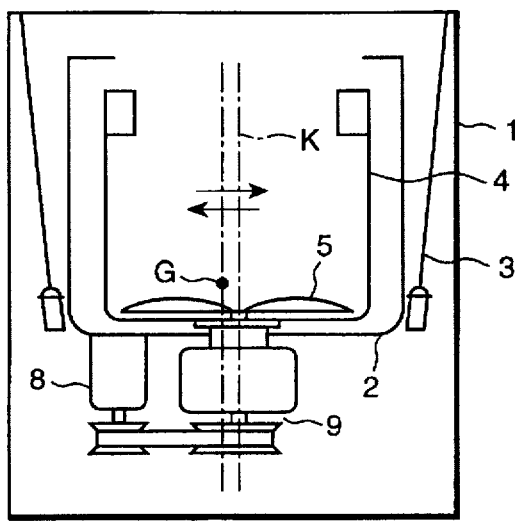
FIG. 6 is a schematic diagram showing a primary resonance state of the tub.
Figure 7:
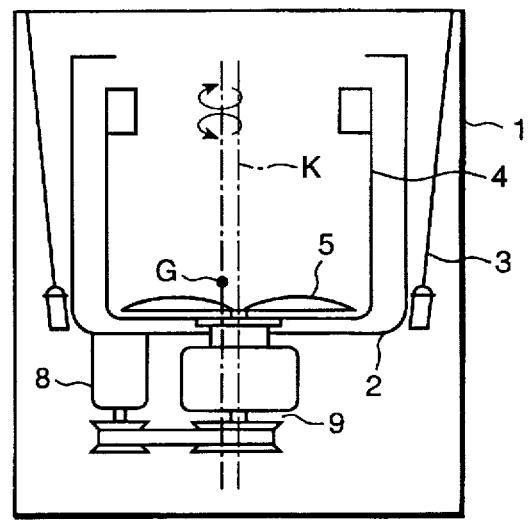
FIG. 7 is a schematic diagram showing a secondary resonance state of the tub.
Figure 8:
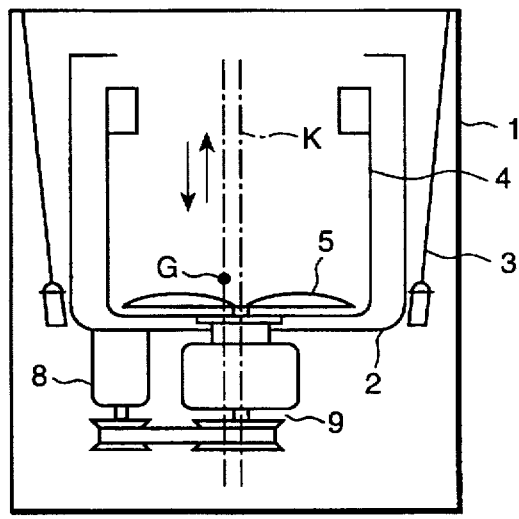
FIG. 8 is a schematic diagram showing a tertiary resonance state of the tub.

Control details will be described with reference to the flowchart shown in FIG. 5. Control flow starts when starting switch 24d is pushed. Control circuit 26 executes laundry amount detecting process (step S1). In this laundry amount detecting process, control circuit 26 turns on and off motor 8 in an specified ON/OFF pattern to rotate rotating tub 4 before supplying water to rotating tub 4, or when only laundry is placed in rotating tub 4. At this time, control circuit 26 reads a signal Sm (shown in FIG. 3) indicative of a motor operational characteristic, i.e. the load of motor 8. As an example, signal Sm could be a signal representing the speed of rotation of motor 8. The greater the amount (weight) of laundry placed in rotating tub 4, the slower the speed of motor 8 will be. Thus, it is possible to determine the amount of laundry based on the speed of motor 8 indicated by signal Sm. If motor 8 is a two phase induction motor having a running condenser, the inter-terminal voltage of the running condenser can be used as a load indicator. In this case, the voltage of the running condenser is inversely proportional to the amount of laundry. As an alternative, the current flowing through motor 8, which is proportional to the load of motor 8 may be used. Control circuit 26 decides, based on the above input, how much laundry is being washed. In the presently preferred embodiment, the laundry load is classified into one of four stages: "Laundry weight High", "Laundry weight Medium", "Laundry weight Low" and "Laundry weight MINimum" in response to the result of the laundry amount detection.

After that, control circuit 26 determines the appropriate water supply level based on the amount of laundry. When the amount of laundry is "Laundry weight High", the water supply level is "High", when it is "Laundry weight Medium", the water supply level is "Medium", when it is "Laundry weight Low", the water supply level is "Slightly Low", when it is "Laundry weight MINimum", the water supply level is "Low" (step S2). After the water supply level decision is made, control circuit 26 executes the washing mode. Control circuit 26 controls water supply valve 21, transmission 8d and motor 8 based on the decided water level (step S3).

When the washing mode is finished, control circuit 26 opens discharge valve 6 to discharge water from rotating tub 4 (step S4). Then, at step S5, rinse mode operation begins.

In step S5, a inquiry is made as to whether the water level decided in step S2 is "High" ("Laundry weight High"). If YES, first spin dry operation is carried out for 3 minutes (step S8). In the first spin dry operation, motor 8 rotates tub 4 at high speed in one direction. Permeating water in the laundry including detergent separates from the laundry, and discharges out of the washing machine through water extraction holes 11, outer tub 2 and through hose 7b. Three minutes after the first spin dry mode operation starts, the spin dry rinse cycles (steps S9 to step S14) are carried out. Each spin dry rinse cycle includes a spin dry rinse operation and a spin dry operation. Thus, the spin dry rinse operation of step S9 and the spin dry operation of step S10 together comprise the first spin dry rinse operation. In a similar fashion, steps S11 and S12 taken together constitute the second spin dry rinse cycle, and steps S13 and S14 together constitute the third spin dry rinse cycle. Consequently, when the water level is "High" ("Laundry weight High"), the spin dry rinse cycle is repeated at 3 times in the spin dry rinse mode.

Figure 4A:
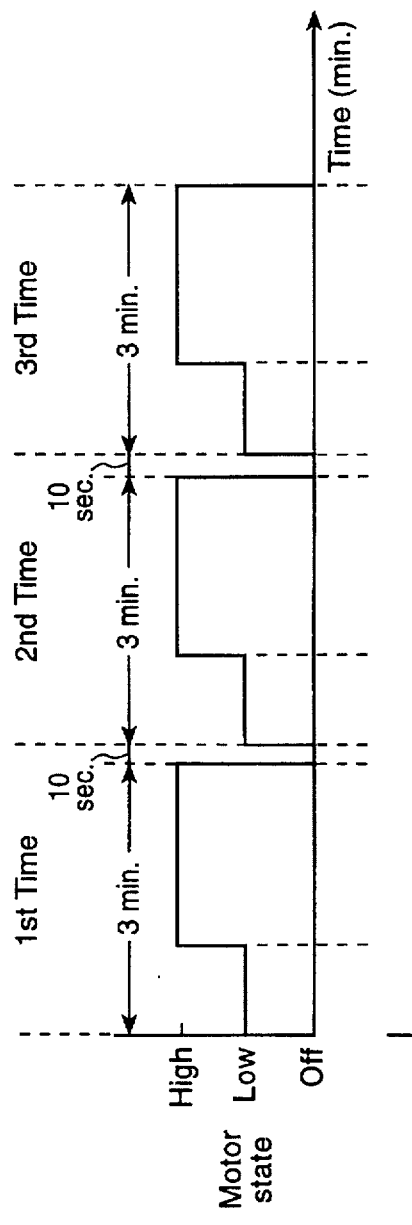
FIGS. 4(a) to 4(c) are timing charts showing the driving state of the motor which drives a rotating tub of the washing machine, the state of a water supply valve for supplying water into a rotating tub, and the variation of speed of the rotating tub, respectively.
Figure 4B:
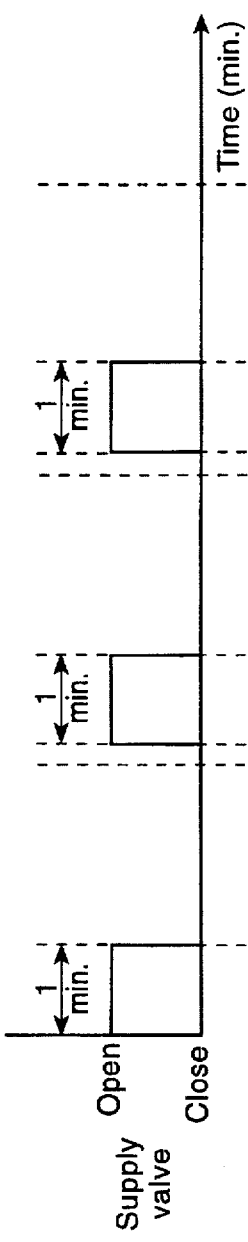
Figure 4C:
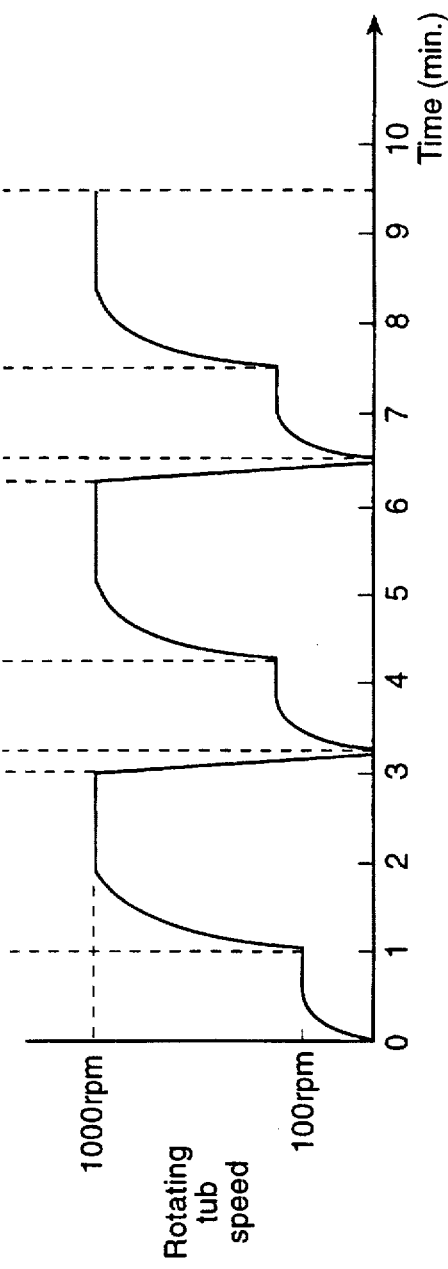

As shown in FIGS. 4(a) to 4(c), in the first spin dry rinse mode, water supply valve 21 is opened by switching it ON by drive circuit 30. At the same time, rotating tub 4 is driven at low speed (100 rpm) by motor 8 (step S9). During the spin dry rinse mode, discharge valve is opened (not shown). One minute after starting the first spin dry rinse mode, the spin dry operation of the first spin dry rinse cycle is started. In the spin dry operation, water supply valve 21 is closed, and rotating tub 4 is driven at high speed (1000 rpm). The spin dry operation continues for 2 minutes (step S10). Accordingly, the first spin dry rinse cycle takes 3 minutes. After that, motor 8 is turned off. Ten seconds after turning off motor 8, the second spin dry rinse cycle is carried out in the same way as first spin dry rinse cycle (steps S11 and S12). Ten seconds after second spin dry rinse cycle, third spin dry rinse cycle is carried out in the same way as first spin dry rinse cycle (steps S13 and S14).

In the spin dry rinse operation of each spin dry rinse cycle, new water supplied via water supply valve 21 permeates the laundry inside rotating tub 4, and the permeated water dissolves detergent left in the laundry. In the following spin dry operation, detergent-laden water is evacuated from the laundry and tub by rotating the tub at high speed. This efficiently removes the detergent from the laundry.

After third spin dry rinse cycle, a hold water rinse operation is executed for a predetermined time (step S15). In this operation, water supply valve 21 is opened, and discharge valve 6 is closed. When the level of the water inside rotating tub 4 reaches a predetermined level, water supply valve 21 is closed and only agitator 5 is rotated by motor 8. Then, a final spin dry operation is carried out. In the final spin dry operation, water in tub 4 is discharged through discharge valve 6 when rotating tub 4 rotates at high speed for a predetermined time (step S16). The laundry washing is completed when the final spin dry operation is finished.

Now consider the case where the water level is not "High". The inquiry of step S5 is NO, and operation flow goes to step S6. In step S6, another inquiry is made whether the water level is "Medium". If the water level is "Medium", the operation flow goes to step S17 and steps S17 to S23 are executed. For this situation, only the steps different from those set forth in steps S8 to S16 (water "HIGH") will be described.

The time spent in the first spin dry operation (step S17) is shortened to 1.5 minutes. The third spin dry rinse cycle is omitted, thus the number of spin dry rinsing cycles becomes two. Furthermore, the time spent in each operation in the spin dry rinse cycles, namely time of the spin dry operation and the spin dry rinse operation, is halved, respectively.

When the water level is neither "High" nor "Medium", that is the inquiry in steps S5 and S6 are NO, operation flow goes to step S7. In step S7, another inquiry is made whether the water level is "Slightly Low". If the water level is "Slightly Low", operation flow goes to step S24 and steps S24 to S30 are executed. For this case, only the steps different from those above-described with respect to water level is "High" will be described. The time spent in the first spin dry operation (step S24) is shortened to 1 minute. The number of spin dry rinsing cycles becomes two. Furthermore, the time spent in the spin dry operation and the spin dry rinse operation which are included in the twice spin dry rinse cycles become 0.5 minute (30 seconds), respectively.

If the water level is "Low", steps S31 to S35 are carried out. In this case, only one spin dry rinsing cycle is executed, and the time spent in the spin dry operation (step S32) and the spin dry rinse operation (step S33) is 0.5 minute, respectively.

In this embodiment, the amount (weight) of laundry, is detected and the spin dry rinse mode is varied accordingly. Because the spin dry rinse mode is adjusted to the amount of laundry, time and water usage in the rinse mode can be reduced. Both the number of the spin dry rinse cycles and the time of the spin dry rinse mode are varied. Therefore, time spent and water used can be reduced. Of course, it is possible to use only one of these features to obtain a worthwhile savings, but the use of both provides enhanced savings.

The rotating speed of rotating tub 4 during water supply, or the spin dry rinse operation, which, in this embodiment is preferably about 100 rpm, is set to exceed the secondary resonance speed of the washing machine, but remain less than the quaternary resonance speed. As a result, the washing machine can avoid the influence of the primary, the secondary and the quaternary resonances. The occurrence of unbalanced rotation during water supply can be further suppressed, and the spin dry rinse mode can obtain high stability and high efficiency. If the rotating speed of tub 4 is near the resonance speed of the washing machine, the washing machine resonate and an unbalance rotation of tub 4 will often occur. When unbalanced rotation occurs, the water supplied into rotating tub 4 passing through drain holes 16 is not uniformly sprinkled to the laundry in rotating tub 4, and detergent is not adequately removed from the laundry.

Figure 9:
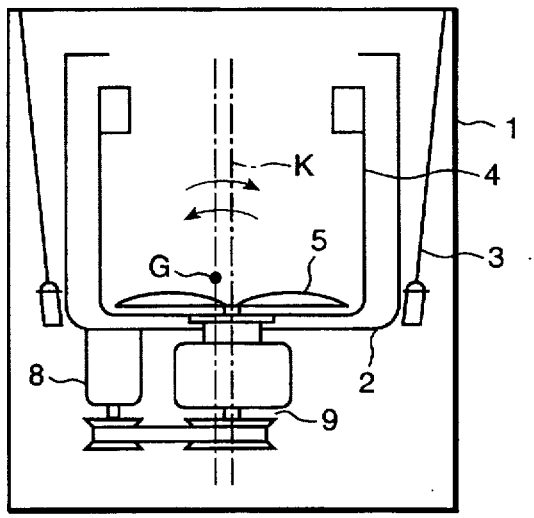
FIG. 9 is a schematic diagram showing a quaternary resonance state of the tub.
Figure 10:
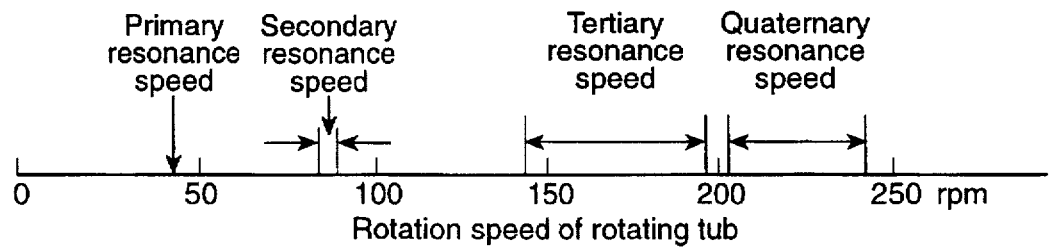
FIG. 10 shows a rotating speed regions of the primary to the quaternary resonance states on a axis of motor of washing machine.

FIGS. 6-9 explain the various resonance states of the washing machine. Only the relevant portions of the washing machine are shown in these figures, the remaining parts being omitted. In each drawing, a point G indicates the center of gravity of the washing machine. K designates the center of rotating tub 4. In the presently preferred embodiment, primary resonance occurs when the speed of rotation of rotating tub 4 is 42-43 rpm. In the primary resonance state, as shown by arrows in FIG. 6, the entire rotating tub 4 tends to laterally oscillate. Secondary resonance occurs when the speed of rotation of rotating tub 4 is 70-77 rpm. In this case, as shown by arrows in FIG. 7, the rotating tub 4 tends to oscillate in the forward and reverse rotation direction. Tertiary resonance occurs when the speed of rotation of rotating tub 4 is 143-193 rpm. In this case, as shown by the arrows in FIG. 8, the rotating tub 4 tends to oscillate in the vertical direction. FIG. 9 shows the quaternary resonance state. It occurs when the speed of rotation of rotating tub 4 is 203-237 rpm. In this quaternary resonance state, as shown by arrows in FIG. 9, the upper part of rotating tub 4 tends to oscillate, that is to say rocking, in the transverse direction with the lower part of rotating tub 4 as the focal point. The regions of the primary to the quaternary resonances speeds are shown in FIG. 10. At the tertiary resonance speed the oscillation is large in the vertical direction. Although, the excitation force is weak, and the amplitude is also small, the attenuation is large. Thus, it does not tend to cause a large unbalance of rotation, compared with primary, secondary and quaternary resonances. Therefore, it is able to suppress the occurrence of unbalanced rotation during water supply, by the setting of the rotation speed of rotating tub 4 at more than the secondary resonance speed and less than the quaternary resonance speed (approximately from 100 rpm to 150 rpm). Furthermore, the speed which is more than the secondary resonance speed and less than the quaternary resonance speed, is far from the primary resonance band having a largest oscillation force among them, thus, it is possible to prevent unbalanced rotation having a large swing.

However, the rotating speed of rotating tub 4 during water supply may be set at any speed other than the primary, secondary, tertiary and quaternary resonance speeds, namely any speed other than a resonance speed to suppress the occurrence of unbalanced rotation during water supply. If the rotation speed of rotating tub 4 during water supply is less than the primary resonance speed, the occurrence of unbalanced rotation during water supply will be suppressed. An added benefit is that rinse efficiency is improved because the rotation speed of rotating tub 4 during water supply becomes even slower allowing more water to be absorbed into the laundry.

Table 1 compares the rinsing effect at various rotating speeds of rotating tub 4 during water supply, or, the spin dry rinse operation.

Rinsing ratios shown in Table 1 are ratios based on a standard comparison established by the Japanese Industrial Standard (JIS) applicable to washing machines. The table sets forth the results of comparing the rinse effect using a rinse method wherein increasing speed of rotation during the spin dry operation, and supplying water during an initial period.

TABLE 1

| Rotation Speed During Water Supply (rpm) | Rinsing Ratio |
| --- | --- |
| 50 | 1.095 |
| 100 | 1.094 |
| 200 | 1.067 |
| 300 | 1.047 |

As shown in the Table 1, at 50 rpm, the rinse effect is improved 1.095 times that of the "standard". At 100 rpm, the improvement is 1.094 times, etc. Thus, the lower the speed of rotating tub 4 during water supply, the greater the rinsing effect. However, low speed is near primary resonance speed, so it is possible to cause the unbalanced rotation. Accordingly, the preferred speed of rotating tub 4 during water supply is from 90 rpm to 130 rpm.

Figure 11:
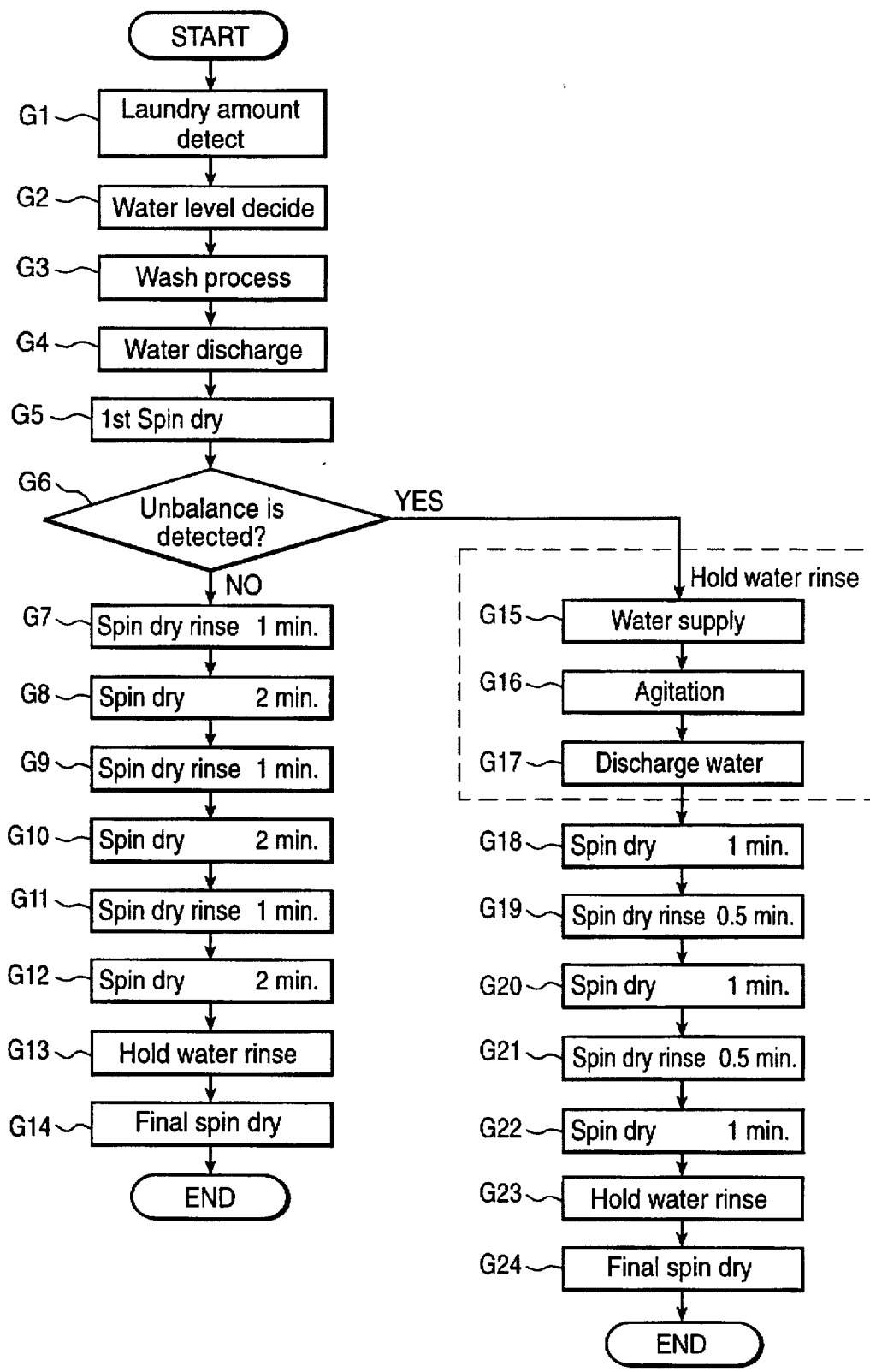
FIG. 11 is a flowchart explaining control of the washing machine.

Referring now to FIG. 11, another function of the washing machine will be explained. The washing machine has an unbalance recovery mode to recover an unbalance of the laundry in rotating tub 4 and a spin dry rinse mode variation. The flowchart set forth in FIG. 11 explains how the control circuit carries out this function. Steps G1 to G4 are the same as above described steps S1 to S4 shown in FIG. 5. The first spin dry operation is carried out in step G5. In step G6, it is determined whether unbalance detect switch 29 has detected an unbalanced rotation of rotating tub 4 during the first spin dry operation in step G5. If it has not detected an unbalanced rotation, the operation flow goes to step G7. In steps G7 to G12, the spin dry rinse cycle which includes a 1 minute spin dry rinse operation and 2 minutes spin dry operation, is carried out three times. After that, a hold water rinse operation (step G13) and a final spin dry operation (step G14) which are the same as steps; S15 and S16, respectively, shown in FIG. 5 are carried out.

If unbalance detect switch 29 has detected an unbalanced rotation in step G5, the operation flow goes to step G15. The unbalance recovery mode is carried out from step G15 to step G18. First, discharge valve 6 is closed and water supply valve 21 is opened, so new water is supplied to rotating tub 4 (step G15). When the water reaches a predetermined level, water supply valve 21 is closed and agitator 5 is turned on. The laundry is agitated (step G16). A predetermined time after agitating, discharge valve 6 is opened and the water in rotating tub 4 is discharged (step G17). The unbalance of the laundry in rotating tub 4 is recovered in this mode. The above described unbalance recovery mode executed in steps G15 to G17 is the same as in the hold water rinse cycle. After that, the spin dry rinse cycle is executed twice (steps G18 to G22). In this spin dry rinse cycle, each spin dry operation (steps G18 and G20) takes 1 minute, while each spin dry rinse operation (steps G19 and G21) takes 0.5 minutes. After step G22, a hold water rinse operation step G23 and a final spin dry operation step G24 are carried out. Accordingly, both execution times of the spin dry rinse mode and the number of the spin dry rinse cycles included in the spin rinse mode are altered.

When an unbalanced rotation of tub 4 is detected, unbalance recovery mode operation including water supply and agitation of the laundry is carried out. Unbalance recovery mode operation functions not only to recover from an unbalance, but also to rinse the laundry. Therefore, the spin dry rinse mode after unbalance recovery mode operation can be shortened in time and number of cycles. Thus, consumption of time and waste of water can be reduced. In particular, in this embodiment, both the execution time of the spin dry rinse mode and the number of cycles of spin dry rinse are reduced. This saves both time and water. However, reduction of either the time of spin dry or the number of spin dry rinse cycles alone, would still be beneficial.

Figure 12:
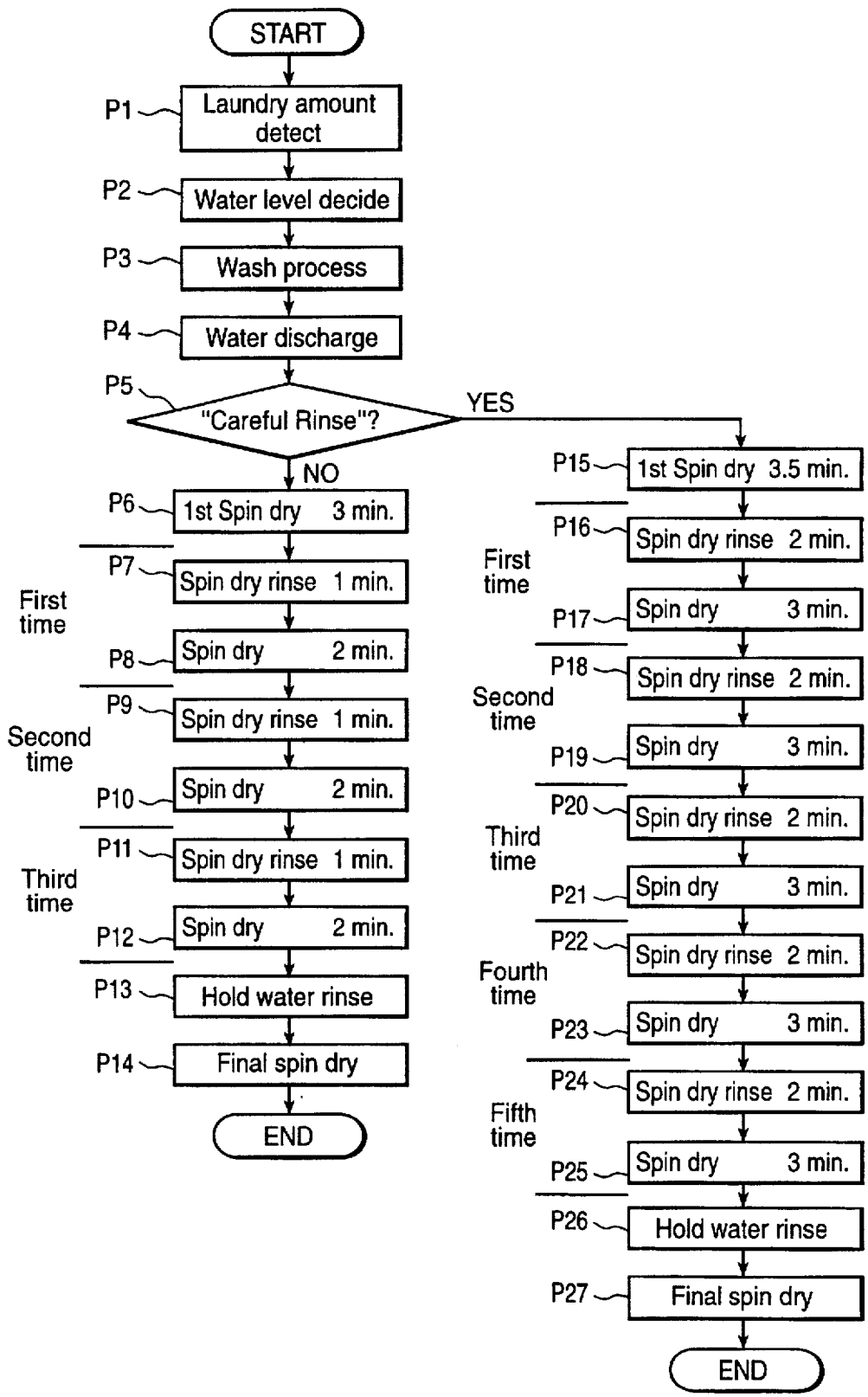
FIG. 12 is a flowchart explaining control of the washing machine.

FIG. 12 is a flowchart explaining another function of the washing machine. A user can select a spin dry rinse operation variation, namely "Careful Rinse" or "Preferred Rinse", by operating the rinse select switch 24b shown in FIG. 2. The operation from steps P1 to P4 is the same as that of steps S1 to S4 shown in FIG. 5. In step P5, control circuit 26 judges whether "Careful Rinse" has been selected by operating the rinse select switch 24b. If "Careful rinse" has not been selected, "Preferred Rinse" is selected and the operation flow goes to step P6. Steps P6 to P14 which are the same as steps S8 to S16, cause there to be three spin dry rinse cycles. If "Careful rinse" has been selected, the operation flow goes to step P15. In step P15, a first spin dry operation is executed for 3.5 minutes. Then, a spin dry rinse cycle is executed 5 times (steps P16 to P25). In each spin dry rinse cycle, a spin dry rinse operation (steps P16, P18, P20, P22 and P24) is executed for 2 minutes, and a spin dry operation (steps P17, P19, P21, P23 and P25) is executed for 3 minutes. After the five spin dry rinse cycles, the hold water rinse operation (step P26) and the final spin dry operation (step P27) are carried out. Namely, when the "Careful Rinse" is selected by a user, the number of the spin dry rinse cycle is made greater, at the same time, each spin dry rinse cycles included in the spin dry rinse mode is lengthened. Therefore, the user can change the degree of rinse whether "Preferred Rinse" or "Careful Rinse".

Figure 13:
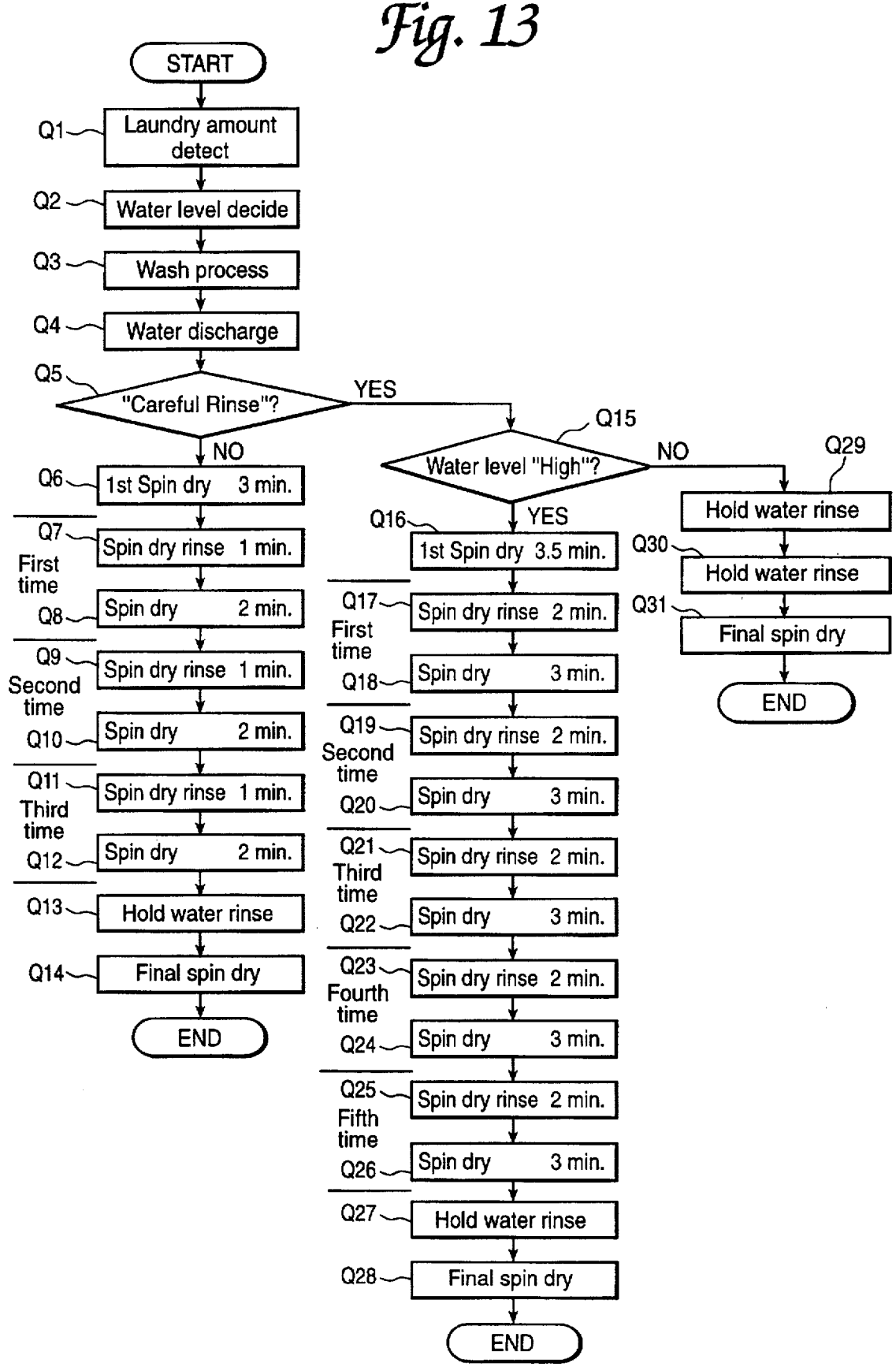
FIG. 13 is a flowchart explaining control of the washing machine according to another embodiment of this invention.

FIG. 13 is a flowchart explaining another embodiment of a washing machine according to the present invention. The difference between this embodiment and the previously described embodiment is in the function of control circuit 26. All other parts are the same as shown in FIGS. 1–3 and will not therefore be described. In this embodiment, when the "Careful Rinse" is selected by rinse select switch 24b, a water level is determined based on the amount of the laundry in rotating tub 4. After determining the proper water level, control circuit 26 changes its rinse mode, either a spin dry rinse mode or a hold water rinse mode. Before rinse mode, the operation of the washing machine is carried out per steps Q1 to Q4 which are the same as corresponding step S1 to S4 shown in FIG. 5. In step Q5, it is determined whether the "Careful Rinse" has been selected. If the "Careful Rinse" has not been selected, steps Q6 to Q14 which are identical to corresponding steps S8 to S16, respectively and include three spin dry rinse cycles, are executed. However, If "Careful Rinse" has been selected, inquiry is made whether the water level decided in step Q2 is "High" (step Q15). If the water level is "High", steps Q16 to Q28 are executed in order. The operations from steps Q16 to Q28 are the same as step P15 to P27 shown in FIG. 12. If water level is not "High", namely, water level is "Medium", "Slightly Low" or "Low", the hold water rinse mode which includes two times hold water rinse operation is executed (steps Q29 and Q30). Each hold water rinse operation is the same as step Q13 and Q27. In this regard, see corresponding steps G15 to G17 in FIG. 11 for detailed explanation. Then, a final spin dry mode is carried out for a predetermined time (step G31).

In this embodiment, after the "Careful Rinse" is selected, further more, if water level is not "High", the hold water rinse mode is selected for the rinse mode. The reason for this selection of rinse mode is that, in the case in which the water level is not "High", using the spin dry rinse mode for obtaining an adequate rinse effect needs more time and water than using the hold water rinse mode to obtain same rinse effect.

Many changes and modifications of the above described embodiment can be carried out without departing from the scope of the general inventive concept as defined by the appended claims and their equivalents.

What is claimed is:

1. A washing machine, comprising:

a tub for receiving laundry to be washed;

means for supplying water into the tub;

means for rotating the tub;

rinse mode control means for controlling 1) water supplied into the tub and 2) rotation of the tub to carry out a spin dry rinse mode which includes a plurality of spin dry rinse cycles, each spin dry rinse cycle including:
 a first operation during which water is supplied into the tub while the tub is rotated, and
 a second operation during which water is not supplied into the tub and the tub is rotated;

rinse degree selecting means for manually selecting a degree of rinse desired; and rinse time changing means for controlling a time period of the spin dry rinse mode by changing a time period of each second operation in accordance with the degree of rinse selected by the rinse degree selecting means.

2. A washing machine, comprising:

a tub for receiving laundry to be washed;

means for supplying water into the tub;

means for rotating the tub;

rinse mode control means for controlling 1) water supplied into the tub and 2) rotation of the tub to carry out a spin dry rinse mode which includes a plurality of spin dry rinse cycles, each spin dry rinse cycle including:
 a first operation during which water is supplied into the tub while the tub is rotated, and
 a second operation during which water is not supplied into the tub and the tub is rotated;

rinse degree selecting means for manually selecting a degree of rinse desired; and operation number changing means for controlling the number of spin dry rinse cycles carried out during the spin dry rinse mode by changing a time period of each second operation in accordance with the degree of rinse selected by rinse degree selecting means.

3. A washing machine according to claim 1, wherein the rotating speed of the tub during the first operation is less than the rotating speed of the tub during the second operation.

4. A washing machine according to claim 2, wherein the rotating speed of the tub during the first operation is less than the rotating speed of the tub during the second operation.

5. A washing machine, comprising:

a tub for receiving laundry to be washed;

means for supplying water into the tub;

means for rotating the tub;

rinse mode control means for controlling 1) water supplied into the tub and 2) rotation of the tub to carry out a spin dry rinse mode which includes a plurality of spin dry rinse cycles, each spin dry rinse cycle including:
 a first operation during which water is supplied into the tub while the tub is rotated, and
 a second operation during which water is not supplied into the tub and the tub is rotated;

rinse degree selecting means for manually selecting a degree of rinse desired; and rinse time changing means for controlling a time period of the spin dry rinse mode by changing a time period of each first operation and each second operation in accordance with the degree of rinse selected by the rinse degree selecting means.

6. A washing machine, comprising:

a tub for receiving laundry to be washed;

means for supplying water into the tub;

means for rotating the tub;

rinse mode control means for controlling 1) water supplied into the tub and 2) rotation of the tub to carry out a spin dry rinse mode which includes a plurality of spin dry rinse cycles, each spin dry rinse cycle including:
 a first operation during which water is supplied into the tub while the tub is rotated, and
 a second operation during which water is not supplied into the tub and the tub is rotated;

rinse degree selecting means for manually selecting a degree of rinse desired; and operation number changing means for controlling the number of spin dry rinse cycles carried out during the spin dry rinse mode by changing a time period of each first operation and each second operation in accordance with each degree of rinse selected by rinse degree selecting means.

7. A washing machine according to claim 5, wherein the rotating speed of the tub during the first operation is less than the rotating speed of the tub during the second operation.

8. A washing machine according to claim 6, wherein the rotating speed of the tub during the first operation is less than the rotating speed of the tub during the second operation.

9. A washing machine, comprising:

a tub for receiving laundry to be washed;

a water supplying unit for supplying water into the tub;

a mechanism for rotating the tub;

a rinse mode controller for controlling 1) water supplied into the tub and 2) rotation of the tub to carry out a spin dry rinse mode which includes a plurality of spin dry rinse cycles, each spin dry rinse cycle including:
 a first operation during which water is supplied into the tub while the tub is rotated, and
 a second operation during which water is not supplied into the tub and the tub is rotated;

a rinse degree selector for manually selecting a degree of rinse desired; and a rinse time controller for controlling a time period of the spin dry rinse mode by changing a time period of each second operation in accordance with the degree of rinse selected by the rinse degree selector.

10. A washing machine, comprising:

a tub for receiving laundry to be washed;

a water supplying unit for supplying water into the tub:

a mechanism for rotating the tub;

a rinse mode controller for controlling 1) water supplied into the tub and 2) rotation of the tub to carry out a spin dry rinse mode which includes a plurality of spin dry rinse cycles, each spin dry rinse cycle including:
 a first operation during which water is supplied into the tub while the tub is rotated, and
 a second operation during which water is not supplied into the tub and the tub is rotated;

a rinse degree selector means for manually selecting a degree of rinse desired; and an operation number controller means for controlling the number of spin dry rinse cycles carried out during the spin dry rinse mode by changing a time period of each second operation in accordance with the degree of rinse selected by rinse degree selector.

11. A washing machine according to claim 9, wherein the rotating speed of the tub during the first operation is less than the rotating speed of the tub during the second operation.

12. A washing machine according to claim 10, wherein the rotating speed of the tub during the first operation is less than the rotating speed of the tub during the second operation.

13. A washing machine, comprising:

a tub for receiving laundry to be washed;

a water supplying unit for supplying water into the tub;

a mechanism for rotating the tub;

a rinse mode controller for controlling 1) water supplied into the tub and 2) rotation of the tub to carry out a spin dry mode which includes a plurality of spin dry rinse cycles, each spin dry rinse cycle including:
 a first operation during which water is supplied into the tub while the tub is rotated, and
 a second operation during which water is not supplied into the tub and the tub is rotated;

a rinse degree selector for manually selecting a degree of rinse desired; and rinse time controller for controlling a time period of the spin dry rinse mode by changing a time period of each first operation and each second operation in accordance with the degree of rinse selected by the rinse degree selector.

14. A washing machine, comprising:

a tub for receiving laundry to be washed;

a water supplying unit for supplying water into the tub;

a mechanism for rotating the tub;

a rinse mode controller for controlling 1) water supplied into the tub and 2) rotation of the tub to carry out a spin dry rinse mode which includes a plurality of spin dry rinse cycles, each spin dry rinse cycle including:
 a first operation during which water is supplied into the tub while the tub is rotated, and
 a second operation during which water is not supplied into the tub and the tub is rotated;

a rinse degree selector for manually selecting a degree of rinse desired; and a operation number controller for controlling the number of spin dry rinse cycles carried out during the spin dry rinse mode by changing a time period of each first operation and each second operation in accordance with each degree of rinse selected by rinse degree selector.

15. A washing machine according to claim 13, wherein the rotating speed of the tub during the first operation is less than the rotating speed of the tub during the second operation.

16. A washing machine according to claim 14, wherein the rotating speed of the tub during the first operation is less than the rotating speed of the tub during the second operation.

* * * * *